(12) United States Patent
Moyer et al.

(10) Patent No.: US 11,178,890 B2
(45) Date of Patent: Nov. 23, 2021

(54) ADVANCED OXIDATIVE PROCESS FOR MICROBIAL REDUCTION

(71) Applicant: HARPC Solutions Inc., Beamsville (CA)

(72) Inventors: Paul Moyer, Beamsville (CA); Mark VanderVeen, Burlington (CA)

(73) Assignee: CLEAN WORKS INC., Beamsville (CA)

(*) Notice: Subject to any disclaimer, the term of this patent is extended or adjusted under 35 U.S.C. 154(b) by 301 days.

(21) Appl. No.: 15/643,037

(22) Filed: Jul. 6, 2017

(65) Prior Publication Data

US 2018/0303133 A1 Oct. 25, 2018

Related U.S. Application Data

(60) Provisional application No. 62/489,180, filed on Apr. 24, 2017.

(51) Int. Cl.
*A23L 3/28* (2006.01)
*A23B 7/144* (2006.01)
(Continued)

(52) U.S. Cl.
CPC .............. *A23L 3/28* (2013.01); *A23B 7/005* (2013.01); *A23B 7/015* (2013.01); *A23B 7/144* (2013.01);
(Continued)

(58) Field of Classification Search
CPC ......... A23B 7/005; A23B 7/015; A23B 7/144; A23B 7/153; A23B 7/157; A23L 3/16;
(Continued)

(56) References Cited

U.S. PATENT DOCUMENTS 5,213,759 A * 5/1993 Castberg .................. A61L 2/08
250/455.11
6,066,348 A 5/2000 Tuan et al.
(Continued)

FOREIGN PATENT DOCUMENTS

CA 2868112 A1 9/2013
CN 104749656 A 4/2014
(Continued)

OTHER PUBLICATIONS

M. Sharma, et al., "Ozone gas is an effective and practical anibacterial agent", Applied Epidemiaology in Health Care Setting and Community, Oct. 2008, vol. 36, No. 8, pp. 559-563.
(Continued)

*Primary Examiner* — Kevin Joyner
(74) *Attorney, Agent, or Firm* — Norris McLaughlin, P.A.

(57) ABSTRACT

Disclosed is system for inactivating bacteria and/or reducing microbial count on product, in particular a food product, susceptible to microbial presence, said system comprising a processing chamber which is operably connected to i) a means for generating UV-C light, ii) a means for generating hydrogen peroxide vapor and/or means for generating ozone, and iii) a heat source. Also disclosed is a method for inactivating bacteria and/or reducing microbial count on a product, in particular food product, which is susceptible to microbial presence, said method comprising subjecting said product in a processing chamber to exposure with ultraviolet C (UV-C) light and hydrogen peroxide vapor and/or ozone, and heat, for a processing time of between 5-120 seconds, wherein the hydrogen peroxide vapor is present at up to 12% v/v solution, and the temperature inside the processing chamber is maintained between about 22° C. and 60° C.

11 Claims, 8 Drawing Sheets

(51) Int. Cl.

| | |
|---|---|
| *A23B 7/153* | (2006.01) |
| *A61L 2/10* | (2006.01) |
| *A61L 2/20* | (2006.01) |
| *A23L 3/3454* | (2006.01) |
| *A23L 3/3409* | (2006.01) |
| *A23L 3/16* | (2006.01) |
| *A23L 3/358* | (2006.01) |
| *A23B 7/157* | (2006.01) |
| *A23B 7/015* | (2006.01) |
| *A23B 7/005* | (2006.01) |

(52) U.S. Cl.
CPC .............. *A23B 7/153* (2013.01); *A23B 7/157* (2013.01); *A23L 3/16* (2013.01); *A23L 3/3409* (2013.01); *A23L 3/3454* (2013.01); *A23L 3/358* (2013.01); *A23V 2002/00* (2013.01)

(58) Field of Classification Search
CPC ........ A23L 3/28; A23L 3/3409; A23L 3/3454; A23L 3/358; A23V 2002/00
See application file for complete search history.

(56) References Cited

U.S. PATENT DOCUMENTS

| | | | |
|---|---|---|---|
| 6,171,625 B1* | 1/2001 | Denvir | A23B 7/144 426/320 |
| 6,183,691 B1* | 2/2001 | Swank | B65B 55/04 422/24 |
| 6,485,769 B2* | 11/2002 | Audy | A23B 4/16 422/269 |
| 7,401,469 B2 | 7/2008 | Joshi et al. | |
| 2006/0078459 A1* | 4/2006 | Kohler | A61L 2/208 422/3 |
| 2007/0059410 A1* | 3/2007 | Steffen | A23B 7/015 426/236 |
| 2008/0220133 A1 | 9/2008 | Carman et al. | |

FOREIGN PATENT DOCUMENTS

| | | |
|---|---|---|
| CN | 105056266 A | 11/2015 |
| CN | 204889204 U | 12/2015 |
| CN | 205602416 U | 9/2016 |
| GB | 2 378 631 A | 2/2003 |
| JP | 2000004782 A | 1/2000 |
| JP | 2001017518 A | 1/2001 |
| JP | 2008/283909 A | 11/2008 |
| TR | 201308348 A | 2/2015 |
| WO | 2013126024 A1 | 8/2013 |
| WO | 2016094658 A1 | 6/2016 |

OTHER PUBLICATIONS

International Search Report for related PCT application PCT/CA2017/050821 dated Oct. 4, 2017.
Written Opinion of the International Searching Authority for related PCT application PCT/CA2017/050821 dated Oct. 4, 2017.
Miller, et al., "A Review on Ozone-Based Treatments for Fruit and Vegetables Preservation", Food Engineering Reviews, 2013, 5, pp. 77-106.
Candia, et al., "Eradication of high viable loads of Listeria monocytogenes contaminating food-contact surface", Frontiers in microbiology, Jul. 2015, vol. 6, article 733.
International Search Report for corresponding PCT application PCT/CA2017/050818 dated Jan. 3, 2018.
Written Opinion of the International Searching Authority for corresponding PCT application PCT/CA2017/050818 dated Jan. 3, 2018.
K. Whangchai, et al., "Effect of Ozone and Vapor Phase Hydrogen Peroxide Fumigation on the Control of Postharvest Diseases of Longan Fruit (*Dimocarpus longon Lour.*)", Thai Journal of Agriculture Science, 2011, vol. 44, No. 5, pp. 219-223.
M. E. Parish, et al., "Methods to Reduce/Eliminate Pathogens from Fresh and Fresh-Cut Produce", Chapter V, Comprehensive Reviews in Food Science and Food Safety, 2003, vol. 2 (supplement), pp. 161-173.
K. Back, et al., "Effect of hydrogen peroxide vapor treatment for inactivating *Salmonella typhymurium*, *Escherichia coli* O157:H7 and Listeria monocytogenes on organic fresh lettuce", Food Control, 2014, vol. 44, pp. 78-85.
S. Wani, et al., "Effect of Ozone Treatment on Inactivation of *Escherichia coli* and *Listeria* sp. on Spinach", Agriculture, vol. 5, pp. 155-169, 2015.
Japanese Office Action dated May 11, 2021, issued in connection with Japanese Application No. 2019-503279.
Antes F. et al. "Processing Lines and Alternative Preservation Techniques to Prolong the Shelf-life of Minimally Fresh Processed Leafy Vegetables," European Journal of Hoticulture Science, vol. 70, No. 5, pp. 231-245, Oct. 2005.

* cited by examiner

ADVANCED OXIDATIVE PROCESS FOR MICROBIAL REDUCTION

This U.S. Non-provisional application claims benefit of U.S. Provisional Application No. 62/489,180, filed Apr. 24, 2017, the disclosure of which patent application is incorporated herein by reference.

FIELD OF THE INVENTION

The present invention relates generally to methods and systems for reducing microbial count in food. The methods and systems of the present invention are described herein with reference to apples in order to facilitate understanding of the invention. However, it should be clear to those skilled in the art that applicability of said methods and systems is not limited to apples. Rather, said methods and systems can be adapted to reduce microbial count in other products susceptible to undesirable microbial presence, such as other fruits and vegetables.

DISCUSSION AND COMPARISON WITH RELEVANT PRIOR ART

In December 2014, a multistate listeriosis outbreak in the United States was linked to consumption of caramel-coated apples. Over the next few months, an investigation revealed that the *Listeria* originated on the surface of the affected apples, which were subsequently introduced into the interior of the apples when sticks to be used as handles punctured the apples during production. Although risk of listeriosis from candy apples can still be regarded as low, there is a need to apply preventative measures during caramel apple production.

Washing apples in aqueous sanitizers is one example of such preventative measure. However, water wash systems are not always practical due to cost and space limitations as well as concerns about bringing water into a manufacturing facility. Further, this sanitizing option was found to have limited efficacy in removing contamination (<1 log cfu reduction) and potentially can lead to cross-contamination (Perez-Rodriguez et al., 2014, "Study of the cross-contamination and survival of *Salmonella* in fresh apples", International Journal of Food Microbiology, 184, 92-97, the entire disclosure of which is incorporated herein by reference). In addition, residual moisture on apples impedes coating of caramel on apples thereby creating difficulties during production. Consequently, aqueous free approaches (for example, hydrogen peroxide vapor) are more compatible with candy apple production and moreover, have proven to be effective in decontaminating produce when compared to traditional post-harvest washing (Back et al., 2014, "Effect of hydrogen peroxide vapor treatment for inactivating *Salmonella Typhimurium, Escherichia coli* 0157:H7 and *Listeria monocytogenes* on organic fresh lettuce." Food Control, 44, 78-85, the entire disclosure of which is incorporated herein by reference).

Ozone has been associated with antimicrobial activities and designated as Generally Recognized as Safe (GRAS) by the U.S. Food and Drug Administration. (See, e.g., Sharma and Hudson, "Ozone gas is an effective and practical antibacterial agent", Am J Infect Control. 2008 October; 36(8): 559-63, the entire disclosure of which is incorporated herein by reference). Processes of using solution containing ozone for decontaminating food are described in, e.g., U.S. Pat. Nos. 6,485,769 and 6,162,477. However, water is often the source of contamination in food manufacturing facilities. Moreover, as noted above aqueous free approaches are more compatible with certain types of food products including candy apples.

More recently, use of ozone gas was suggested. (See, e.g., Khadre et al., 2001, "Microbiological aspects of ozone applications in food: A review", Journal of Food Science, 66, 1262-1252, the entire disclosure of which is incorporated herein by reference). Previous studies have demonstrated that ozone introduced into the atmosphere of storage rooms can reduce microbial loading on fruit (Yaseen et al., 2015, "Ozone for post-harvest treatment of apple fruits", Phytopathologia Mediterranea, 54, 94-103, the entire disclosure of which is incorporated herein by reference). However, ozone in storage rooms is applied at a low level (0.5-2 ppm) to prevent excessive corrosion of fittings and reduce hazards to workers. Consequently, an extended exposure time is required to achieve microbial reductions although contacting each individual apple represents a challenge.

Alternative to ozone, UV has been known to elicit antimicrobial activity through photons directly damaging DNA of the target microbe. Although UV has been widely used for disinfection of water and other clear liquids, so far UV treatment of foodstuff surfaces remain problematic due to shading effects caused by irregular contours and/or presence within biofilms or cell clumps.

The present invention addresses the above described shortcomings of prior art methods and systems by combining UV treatment with oxidizing agents such as ozone or hydrogen peroxide or combinations thereof. For instance the inventors propose combining ozone treatment with a process termed Advanced Oxidative Process (AOP) (combination of hydrogen peroxide and UV), which process is useful for treating turbid waters and carton packaging.

SUMMARY OF THE INVENTION

The present invention provides for a method for inactivating bacteria on a food product susceptible to (surface, sub-surface and internal) microbial presence, which comprises contacting the food product to be treated with ultraviolet C (UV-C) light, hydrogen peroxide and/or ozone, as well as heat, which method can comprise use of a system comprising means of providing each of said UV-C light, hydrogen peroxide and/or ozone, and heat.

DETAILED DESCRIPTION

While aspects of the invention described herein are described with reference to reducing microbial count in fruit, in particular apples, it should be appreciated that the described methods, systems and related assemblies can be used to reduce microbial count in other types of food or products.

Further, specific embodiments and examples of the methods and systems described herein are illustrative, and many variations can be introduced on these embodiments and examples without departing from the spirit of the disclosure or from the scope of the appended claims. Elements and/or features of different illustrative embodiments and/or examples may be combined with each other and/or substituted for each other within the scope of this disclosure and appended claims.

Definitions

As used herein, and unless stated otherwise, each of the following terms shall have the definition set forth below.

As used herein, "about" in the context of a numerical value or range means±10% of the numerical value or range recited or claimed. By any range disclosed herein, it is meant that all hundredth, tenth and integer unit amounts within the range are specifically disclosed as part of the invention. Accordingly, "about" a recited value specifically includes that recited value. For example, a range of about 20 minutes refers to all measurements within the range of ±10% of 20 minutes, including 20 minutes.

To overcome shortcomings associated with prior art treatment of foodstuff to reduce microbial count therein, the present invention proposes combining UV treatment with oxidizing agents such as ozone or hydrogen peroxide or combinations thereof. In the proposed AOP process, hydrogen peroxide is degraded by UV photons to form short-lived, antimicrobial free radicals that can penetrate into shaded areas on the surface of the foodstuff to be treated.

AOP was demonstrated to decontaminate fresh produce. The critical parameters for supporting AOP processes are temperature and hydrogen peroxide concentration. Specifically, the reaction to generate radicals is favored at 48° C. but less so at the typical room temperature (approximately 22° C.). Further, AOP processes have an optimum hydrogen peroxide concentration, since too low levels of hydrogen peroxide will result in insufficient radical generation, while an excess of hydrogen peroxide can cause density of radicals to become too high such that they ultimately combine, and are thereby neutralized.

An added advantage is obtained when a combination of ozone and hydrogen peroxide vapor is used. Due to presence of hydrogen peroxide vapor in the chamber, relative humidity surrounding the fruit to be treated is increased so that susceptibility of microbial cells to the lethal effects of ozone is also expected to increase (Miller et al., 2013, "A review on ozone-based treatments for fruit and vegetables preservation", Food Engineering Reviews, 5, 77-106 and de Candia et al., 2015, "Eradication of high viable loads of *Listeria monocytogenes* contaminating food-contact surfaces. Frontiers in Microbiology, 6, 12, the entire disclosure each is incorporated herein by reference).

Through a series of experiments, the inventors of the methods and systems described herein showed that *Listeria* can be killed on produce, in particular apples, by treating them with various combinations of UV-C light, hydrogen peroxide, heat and ozone. In this series of experiments, the results ranged from a 0-log to a 6-log kill. Each "log" reduction indicates the extent of the kill by a factor of 10. That is to say there was 99% (2-log) to 99.999% (5-log) kill of *Listeria*. The system used in these experiments comprises a reactor, which reactor has a treatment chamber with UV-C and/or ozone lamps located therein, as well as means for providing hydrogen peroxide vapor and heat to the processing chamber. The distance from lamps, acid concentration, acid flow rate, temperature and dwell time are all controlled. Initial positive laboratory results suggested that a commercial scale application test was warranted. Accordingly, a continuous conveyor unit for transporting apples through the processing chamber was built to replace the sealed chamber design.

Accordingly, in one embodiment of the present invention, a system for inactivating bacteria and/or reducing microbial count on a food product susceptible to surface and internal microbial presence is provided, said system comprising a chamber which is operably connected to means for producing and/or suppling to the foodstuff each of UV-C light, hydrogen peroxide and/or ozone, and heat. In a preferred embodiment, the system comprises means for producing and/or supplying to the foodstuff each of UV-C light, hydrogen peroxide and ozone. It is possible to use ozone gas or even introduce ozonated water containing peroxide. In an embodiment of the system as described herein, the system further comprises a means for transporting the product be treated, e.g., a conveyor, and/or a temperature sensor. A continuous conveyor can allow food product to be treated to flow continuously through the processing chamber, such that the treatment can be on small (1-5 lb./hour), medium (5-500 lb./hour) or large scale (>500 lb./hour). In a further embodiment, the methods and systems described herein can be adapted for removal of pesticide from food products.

In an embodiment, the chamber has capacity to hold at least 1, at least 10, at least 100 or at least 200 lbs of food product.

In an embodiment of the method as described herein, the bacteria is *Listeria*. In another embodiment, the bacteria is *Salmonella* or *E. Coli*.

In one embodiment, the food product is a fruit or a vegetable. In another embodiment, the food product is apple, melon, lettuce, mushroom, zucchini or cucumber (whole or core). In another embodiment, the food product is avocado, peaches, lemon, cantaloupe, pepper, tomato or mango. In yet another embodiment, the food product is seed, spice, tea, or grain.

In one embodiment, the processing chamber is kept at a predetermined humidity during treatment of the food product, which humidity is about 60-100%. In another embodiment, the system is configured such that the product has a dwell time in the processing chamber of from 5 seconds to 2 minutes, or more.

In an embodiment, process parameters of the claimed method for inactivating bacteria on a food product susceptible to microbial presence are as follows:

UV light: The total wattage can be up to 10,000 W. For example, the UV lights can be configured as follows: up to 400×UV-C 23 W lamps emitting at 254 nm (wavelength range between 290 nm and 100 nm); or 3×17 W=51 W total, or 4 bulbs×46 W+2 bulbs on sides×34 W per bulb=252 W total.

Ozone: (if present) up to 400× ozone light bulbs emitting at 174 nm (wavelength range ±50%). Approximately 95% of the ultraviolet energy emitted from the germicidal lamps used by the inventors is at the mercury resonance wavelength of 254 nanometers. This wavelength is in the region of maximum germicidal effectiveness and is highly lethal to virus, bacteria, protozoa and mold. Ultraviolet wavelengths shorter than 200 nanometers are capable of producing ozone from Oxygen ($O_2$) in the air. The ozone lamps used by the inventors, in addition to emitting germicidal ultraviolet output at 254 nanometer wavelength, also emit ozone producing rays at 185 nanometer wavelength.

Although only 7% of the lamp's total energy output, the 185 nanometer wavelength energy has the unique capability to destroy organics by oxidation of the organic to carbon dioxide gas. The extent of the microbial reduction is dependent on both ultraviolet purifier sizing (expressed as dosage level units in microwatt-seconds per square centimeter).

Distance of food product from bulbs: between 1 cm and 200 cm.

Hydrogen peroxide concentration: (if present) between 1% and 12% volume/volume aqueous solution, preferably 1-6%, and more preferably 2-4%.

Hydrogen peroxide flow rate: (if present) between 0 and 10 liters per minute.

Temperature in the processing chamber: between 22° C. and 60° C., preferably 40-55° C., most preferably about 48° C.

Processing chamber Dwell Time: between 5 seconds and 2 minutes.

Humidity inside processing chamber: between 60% to 100%.

Size of processing chamber: 1'×6"×6" to 60'×30'×20'.

An ozone monitor can be optionally installed in the room, which is programmed to automatically shut off the chamber and start the exhaust fan if 0.1 ppm ozone is detected.

The systems and methods of the present invention are advantageous over previously known sanitation methods in that it is eco-friendly. Specifically, the method of the subject invention does not use water, thereby conserving fresh water and avoids creation of chemical water effluent with harsh sanitizing chemicals like chlorine or ammonia. In addition, ozone gas decomposes into oxygen, leaving no dangerous or harmful by-products.

Finally, the combination of any embodiment or feature mentioned herein with one or more of any of the other separately mentioned embodiments or features is contemplated to be within the scope of the instant invention.

Experiments

Materials and Methods

Suitability of *Lactobacillus fructivorans* as a Surrogate for *Listeria monocytogenes*

The relative resistance of *Lactobacillus* to ozone compared to *L. monocytogenes*, was assessed using inoculated apples placed inside a biobubble in which the antimicrobial gas was introduced. It was found that the extent of inactivation of *Lactobacillus* and *L. monocytogenes* by ozone treatment was dependent on the applied time (ozone concentration). In relative terms there was no significant difference ($P>0.05$) in the log reductions of *L. monocytogenes* compared to *Lactobacillus* receiving the same ozone exposure. Therefore, the *Lactobacillus* strain is a suitable surrogate for *L. monocytogenes* that can be applied in commercial trials for accessing the efficacy of ozone treatment.

Bacteria Used and Inoculation of Apples

*Listeria monocytogenes* inoculation suspension was prepared as follows: *Listeria monocytogenes* serotype 4b (isolated from fresh produce) and *Lactobacillus* fructivorans (isolated from wine) were used throughout the study. *L. monocytogenes* was cultivated in 50 ml tryptic soy broth (TSB) for 24 h at 30° C. with *Lactobacillus* being cultivated in MRS broth at 30° C. for 48 h. The cells were harvested by centrifugation (5000 g for 10 min) and pellet re-suspended in saline to a final cell density of 8 log cfu/ml.

For one set of experiment, an apple slice (30 g) was cut from a whole fruit and the skin surface inoculated with 0.1 ml of *Listeria* culture to give a final cell density of 7 log cfu. The apple slices were incubated at 4° C. for 16 h before being treated with UV or UV and hydrogen peroxide. After the treatment, *Listeria* was recovered from the apple slice by submerging in saline to give a final ratio of 1:10 then homogenized by stomaching. A dilution series was prepared in saline then plated out onto Modified Oxford (MOX) formula agar that was incubated at 30° C. for 48 h.

For whole apples, the fruit was steeped inoculated in suspensions containing 7 log cfu/ml for 20 mins. The apples were then removed and placed in a vacuum chamber then subjected to 3×30 s cycles to infiltrate the *Listeria* into the core sub-surface. The apples were removed and stored overnight at 4° C. then used the next day. To recover cells from the treated apples, the core was initially removed using a sterile corer and placed in a sterile bag along with saline to give a 1:10 dilution. The core was homogenized by stomaching for 30 s then a serial dilution prepared in saline. The remainder of the apple was placed into another sterile pouch containing 100 ml of saline and *Listeria* released by massaging. Again, a dilution series was prepared in saline that was plated onto MOx agar then incubated at 30° C. for 48 h.

The UV Reactor

The UV reactor includes an ultraviolet fixture (Sani-Ray™—stainless steel, 24"×9"×5", 120 v 50/60 Hz) comprising 4×23 W lamps (measured at 254 nm at 100 hours and 80° C.) that were 24" long and 15 mm in diameter with a UV output of 8.5, emitting at 254 nm that were held a distance of 16 ml from the conveyer surface. Standard UV lamps (serial #05-1348) and ozone lamps (#05-1349, ozone output of 2.3) were both used (2 of each). A UVX radiometer (UVP™ calibrated to +/−5% according to manufacturer instructions) was used to monitor the lamps intensity to ensure consistency.

The hydrogen peroxide (obtained from Sigma-Aldrich™, 30% solution) was prepared at varying concentrations (2-4% v/v) and was pre-warmed in a hot water bath to 22 or 48° C. then placed in the reservoir of an atomizer/vaporizer. The processing chamber was pre-warmed with a fan heater that was switched off just prior to placing the inoculated apples into the unit. The apples were held in the center of the unit for the allotted time period removed at the opposite end. The set-up can be seen from the schematic of FIG. 1.

Figure 1:
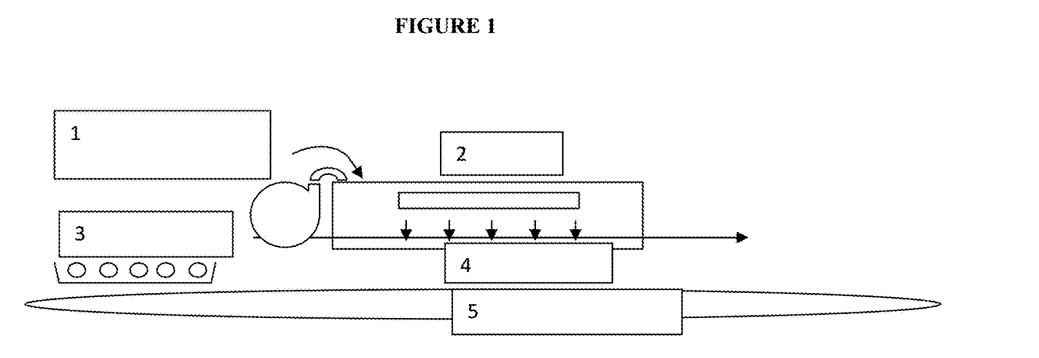
FIG. 1: Schematic of UV: hydrogen peroxide reactor set up for Experiment 1 and Experiment 2.

With reference to FIG. 1, labels in the figure designates the following elements:
1: Hydrogen Peroxide Vaporizer.
2: UV Light.
3: Tray of Apples.
4: Heated Tunnel.
5: Conveyor.

Peracetic Acid

Peracetic Acid (obtained from Sigma-Aldrich™, 40% in acetic acid: water) was diluted to various concentrations from 20-70 ppm was used either as a wash or a spray.

Verification of Combined Ozone and AOP Process to Control *L. monocytogenes*

Apples were spot inoculated (5 $\log_{10}$ CFU/apple) at the calyx of apples with a five strain cocktail of *L. monocytogenes* as described above. The apples were transferred to a cold room and held overnight prior to treatment. Batches of 13 apples were placed in the ozone reactor and treated for 40 minutes. The apples were then dried for a further 50 minutes without ozone then directly transferred to the AOP unit. The AOP treatment was performed placing the apples within the chamber with the calyx facing the UV-C: Ozone lamp. Hydrogen peroxide vapor was generated from a 6% v/v solution pre-warmed to 48° C. Treatment was performed for 30 seconds after which a wooden stick was inserted into the calyx before coating with caramel maintained at 80° C. For the red apples, an additional chocolate layer was added. The apples were then stored on trays within a room maintained at 22° C. Control groups of apples were prepared at the same time as apples to be treated, and stored in the same manner. However instead of being treated with ozone and hydrogen peroxide, they were only exposed to air and water (at otherwise same flow rates and temperatures to mimic the process).

Periodically, candy apples (n=3) were transferred for microbiological analysis. Here, the core was removed using a sterile corer and placed in a sterile bag then re-suspended in One-step enrichment broth to a 1:10 dilution. The core was homogenate in a stomacher for 60 seconds. The part of the stick that was embedded in the apple was manually massaged in the homogenate to release any attached *Listeria*. The remainder of the apple was submerged in 100 ml of One step enrichment broth and manually massaged to release the candy: caramel layers.

The samples were plated onto MOX formula media that was incubated at 30° C. for 48 hours. In parallel, the homogenates were enriched at 37° C. for 24 hours then streaked onto MOx agar that was incubated at 30° C. for 48 hours. A presumptive positive colony from each plate was subjected to confirmation using API test strips.

Bacteria Recovery and Enumeration

Lettuce

After treatment, lettuce heads were chopped, suspended in 500 ml of saline and stomached for 1 minute, a dilution series was prepared in saline. To enumerate STEC, the samples were then spread plated onto MacConkey Sorbitol agar (CT-SMAC) and chromogenic culture media (CHRO-Magar) incubated at 37° C. for 24 hours. *L. monocytogenes* was plated onto MOX Agar incubated at 35° C. for 24-48 hours.

Apples

After having challenges recovering pathogens from apples in the same manner as lettuce, baseline studies were performed in order to determine the optimal method for recovering *Listeria* from the surface of apples. The apples were spot inoculated with 100 µl of *Listeria* [8-log CFU] then allowed to attach for 4 hours. The *Listeria* was then recovered by one of three methods to evaluate the efficiency of each method. The methods were as follows: method (1) whole apples were placed in sterile plastic pouches and suspended in 100 ml of saline and manually rubbed for 1 minute. For method (2) a peeler was used to remove the apple peel which was then placed in 50 ml of saline and vigorously shaken for 1 minute. Lastly, method (3) was the same as described for (2) except the peel was homogenized using a lab top blender. Regardless, of the method of recovery, a dilution series was prepared in saline then spread plated onto MOX Agar incubated at 35° C. for 24-48 hours. Presumptive positive colonies were counts being reported a log CFU.

Effect of *Listeria* Incubation Temperature on Attachment

To determine if the incubation temperature of *Listeria* is important for its attachment to apples, the bacteria was cultivated at both 25° C. (were *Listeria* express flagella) and at 37° C. (i.e. no flagella expressed). The bacteria were allowed time to adhere to the apple before being removed (method 1) as described above.

Statistical Analysis

Each experiment was repeated at least three times with triplicate samples being analyzed. The bacterial counts transformed into $\log_{10}$ values with differences between means performed using ANOVA in combination with the Tukey test.

Experiment 1: UV:Hydrogen Peroxide Treatment

Baseline studies determined the effect of time, hydrogen peroxide concentration (1-1.5%) and temperature (22° C. to 48° C.) on the decontamination of apples inoculated with *L. monocytogenes*. To increase the sensitivity of the assay and avoid geometric effects, apple halves were used instead of whole apples. From the results it was found that UV alone supported a high log reduction of *Listeria* compared to when used in low concentrations of hydrogen peroxide (Table 1). The results can be attributed to direct inactivation of *Listeria* in the absence of shading effects.

With hydrogen peroxide alone, negligible log reductions of *Listeria* were observed although the efficacy could be enhanced by operating the unit at 48° C. compared to 22° C. A more distinct effect of temperature was observed when UV was combined with hydrogen peroxide (Table 1). Here, there were significantly higher log reductions when the unit was run at 48° C. compared to 22° C. The highest log reduction was obtained with using a hydrogen peroxide concentration of 1.5% v/v introduced into the unit at 48° C. with a 30 s residence time. The results can be explained by the AOP proceeding to a greater extent at 48° C. compared to 22° C. At lower concentrations of hydrogen peroxide the lower observed lethality was due to insufficient radicals being formed from the UV decomposition of $H_2O_2$. Yet, presence of hydrogen peroxide was sufficient to absorb the UV photons thereby providing a protective effect to the *Listeria* on the surface of apple.

TABLE 1

Inactivation of *Listeria monocytogenes* on inoculated apple halves by using different UV: hydrogen peroxide combinations.

| Treatment | Time | Initial Loading Log cfu | Log Count Reduction 22° C. | 48° C. |
|---|---|---|---|---|
| None |  | 7.34 ± 0.12 |  |  |
| UV | 15 s |  | >3.04 |  |
|  | 30 s |  | >3.04 |  |
| $H_2O_2$ 1% | 15 s |  | −0.95 ± 0.19 | 0.97 ± 0.70 |
|  | 30 s |  | −0.44 ± 0.13 | 0.38 ± 0.11 |
| $H_2O_2$ 1.5% | 15 s |  | 0.14 ± 0.18 | −0.21 ± 0.01 |
|  | 30 s |  | −0.02 ± 0.29 | 2.78 ± 1.01 |
| UV: $H_2O_2$ 1% | 15 s |  | 1.29 ± 0.20 | 2.75 ± 0.38 |
|  | 30 s |  | 0.92 ± 0.06 | >3.08 |
| UV: $H_2O_2$ 1.5% | 15 s |  | 1.71 ± 0.71 | 3.64 ± 0.67 |
|  | 30 s |  | 2.25 ± 0.83 | >4.40 |

Inactivation of *Listeria monocytogenes* Introduced on and within Whole Apples

Figure 2:
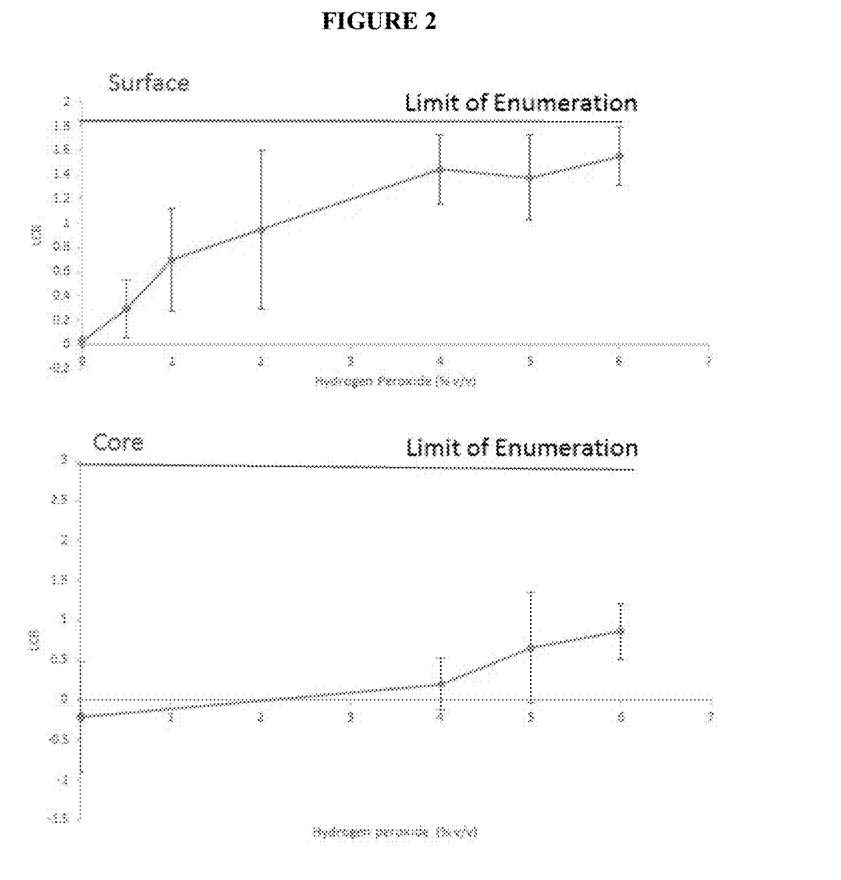
FIG. 2: shows inactivation of *Listeria monocytogenes* on and within apples by UV:hydrogen peroxide from 1-6%. Inoculated apples were placed in the chamber and different concentrations of hydrogen peroxide delivered. All treatments were performed for 60 s at 48° C.

In practical terms, the treatment of whole apples is challenging due to the shading caused by the physical shape of the apple, in addition to *Listeria* being potentially present within the sub-surface of core. Because of the aforementioned shading effects the use of UV alone would be limited. This was indeed found in the current case where UV applied to inoculated whole apples resulted in <1 log cfu reduction of *Listeria* on the surface of apples and no average reduction in levels of the pathogen within the internal core (−0.21±0.69). When UV was used in combination with hydrogen peroxide the LCR of *Listeria* was increased up to 4% v/v $H_2O_2$ beyond which did not support higher reductions of the pathogen (FIG. 2) However, there was a correlation between hydrogen peroxide concentration and reduction in *Listeria* introduced into core tissue of apples (FIG. 2). Here it was found that 6% hydrogen peroxide used in combination with UV could support a 0.86 log cfu reduction in *Listeria* levels that represents a reduction of 84% of the original population.

Figure 3:
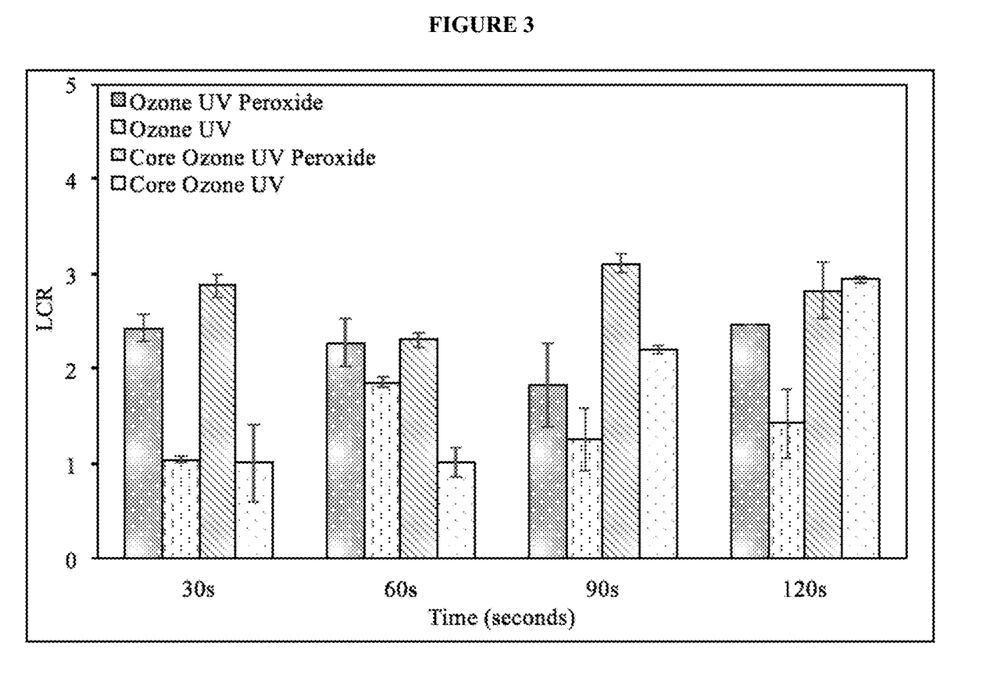
FIG. 3: shows inactivation of *Listeria monocytogenes* on the surface and core of apples using UV:ozone with or without 6% hydrogen peroxide at 48° C. from 30 to 120 seconds.

Experiment 2: Efficacy of a Combination of UV, Hydrogen Peroxide and Ozone to Decontaminate Apples Ozone was generated by replacing one of the UV-C lamps with one that emits at 174 nm with hydrogen peroxide being introduced via a vapor at 48° C. It was found that for a 30 s treatment time the reduction of *Listeria* on the surface of apples was significantly higher when UV:ozone:peroxide was applied compared to UV:ozone treatment. When longer treatment times were applied the extent of inactivation of *Listeria* on the surface of apples was not significantly different between UV:Ozone:peroxide and UV:ozone (FIG. 3). The log reduction of *Listeria* on the surface of apples was independent of the treatment time suggesting that the residual survivors were in protective niches.

Similar to the trend of log reductions on the surface of apples, the inactivation of the pathogen within the core was significantly higher for UV:ozone:peroxide compared to UV:ozone at 30 s of treatment (FIG. 12). However, the extent of *Listeria* inactivation by UV:ozone:peroxide did not increase with extended treatment times. In contrast, the log reduction of *Listeria* within the core by UV:ozone did increase with time and was not significantly different from UV:ozone:peroxide at 120 s.

The results suggest that action of UV:ozone:peroxide results in rapid inactivation of *Listeria* compared to when UV:ozone are applied without $H_2O_2$.

Conclusions

UV:Hydrogen peroxide treatment using 6% $H_2O_2$ at 48° C. for 60 s can significantly reduce *Listeria monocytogenes* on the surface and within the core of apples. The treatment could be enhanced through combining UV:peroxide with ozone.

Experiment 3: Verification of Combined Ozone and AOP Process to Control *Listeria monocytogenes* on Candy Apples The object of this experiment is to evaluate the combined effect of ozone and AOP (UV:hydrogen peroxide:Ozone) to control *L. monocytogenes* on apples and fate of survivors on candy apples stored at 22° C.

Materials and Methods

Apples were spot inoculated (5 log cfu/apple) at the calyx of apples with a five strain cocktail of *L. monocytogenes*. The apples were transferred to a cold room and held overnight prior to treatment. Batches of 13 apples were placed in the ozone reactor and treated for 40 mins. The apples were then dried for a further 50 mins without ozone then directly transferred to the AOP unit. The AOP treatment was performed placing the apples within the chamber with the calyx facing the UV-C:Ozone lamp. Hydrogen peroxide vapor was generated from a 6% v/v solution pre-warmed to 48° C. Treatment was performed for 30 s after which a wooden stick was inserted into the calyx before coating with caramel maintained at 80° C. For the red apples, an additional chocolate layer was added. The apples were then stored on trays within a room maintained at 22° C.

Periodically, candy apples (n=3) were transferred for microbiological analysis. Here, the core was removed using a sterile corer and placed in a sterile bag then re-suspended in One-step enrichment broth to a 1:10 dilution. The core was homogenate in a stomacher for 60 s. The part of the stick that was embedded in the apple was manually massaged in the homogenate to release any attached *Listeria*. The remainder of the apple was submerged in 100 ml of One step enrichment broth and manually massaged to release the candy:caramel layers.

The samples were plated onto MOX Formula media that was incubated at 30° C. for 48 h. In parallel, the homogenates were enriched at 37° C. for 24 h then streaked onto MOx agar that was incubated at 30° C. for 48 h. A presumptive positive colony from each plate was subjected to confirmation using API test strips.

Results

Results of this experiment are shown in FIG. 4 and Tables 2A and 2B below.

Table 2A and 2B: *Listeria monocytogenes* recovered from Candy Apples over a 19 Day Shelf-life at 22° C. Data from FIG. 4.

TABLE 2A (Caramel Chocolate - red apple)

Log cfu/Apple
(Positive by enrichment/Total tested)

| Storage Day at 22° C. | Candy Apples from Non-treated (control) Red Apples | | Candy Apples from Ozone & AOP Treated Red Apples | |
|---|---|---|---|---|
| | Surface | Core | Surface | Core |
| 1 | 4.60 ± 0.01 | 4.17 ± 0.60 | 0 (0/3) | 1.00 ± 1.73 (1/3) |
| 3 | 3.40 ± 0 | 3.73 ± 0.92 | 0 (0/3) | 0.50 ± 0.87 (1/3) |
| 5 | 4.68 ± 0.12 | 3.64 ± 0.38 | 0 (0/3) | 0 (0/3) |
| 8 | 4.33 ± 0.06 | 4.39 ± 0.16 | 0.5 (1/3) | 0.50 ± 0.87 (1/3) |
| 13 | 4.51 ± 0.31 | 5.45 ± 0.73 | 0.5 (1/3) | 1.00 ± 0.87 (2/3) |
| 19 | 4.88 ± 0.09 | 6.31 ± 0.09 | 0 (0/3) | 0 (0/3) |

TABLE 2B (Caramel - green apple)

Log cfu/Apple
(Positive by enrichment/Total tested)

| Storage Day at 22° C. | Candy Apples from Non-treated (control) Green Apples | | Candy Apples from Ozone & AOP Treated Green Apples | |
|---|---|---|---|---|
| | Surface | Core | Surface | Core |
| 1 | 4.64 ± 0.15 | 4.63 ± 0.48 | 0 (0/3) | 1.0 ± 1.73 (1/3) |
| 3 | 3.36 ± 0.12 | 3.64 ± 0.38 | 0 (0/3) | 0.5 ± 0.87 (1/3) |
| 5 | 3.57 ± 0 | 4.39 ± 0.52 | 0 (0/3) | 0.5 ± 0.87 (1/3) |
| 8 | 3.58 ± 0.21 | 3.65 ± 0.16 | 0.5 ± 0.87 (1/3) | 0.5 ± 0.87 (1/3) |
| 13 | 3.46 ± 0.12 | 3.10 ± 0.21 | 0.5 ± 0.87 (1/3) | 0 (0/3) |
| 19 | 3.63 ± 0.16 | 4.40 ± 0.19 | 1.00 ± 0.87 (2/3) | 0 (0/3) |

The *Listeria* levels on control non-treated apples (green and red) was 5 log cfu and numbers decreased by 0.4-0.9 log cfu by the caramel coating process. In candy apples prepared from non-treated green apples, *Listeria* counts at the end of the 19 day shelf-life did not vary significantly (P>0.05) compared to Day 1 (FIG. 4A; Table 2A). However, *Listeria* with the core of non treated apples did increase in levels following a 3 day lag period and was significantly (P<0.05) higher at the end of the 19 day shelf-life (FIG. 4A; Table 2A).

Figure 4A:
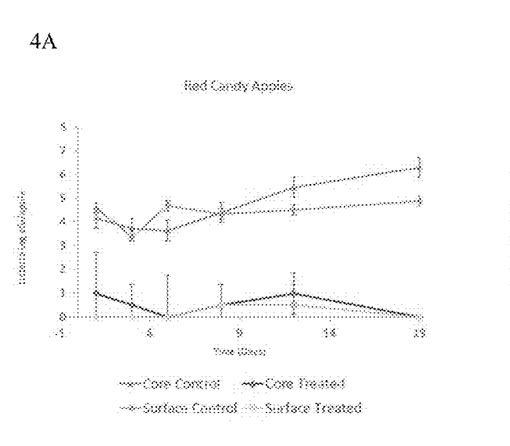
FIGS. 4A and 4B: *Listeria monocytogenes* counts on the surface and core of candy apples stored at 22° C. The apples were inoculated with *Listeria* the treated using a combination of ozone (up to 50 ppm) followed by AOP. The apples were then coated with caramel-chocolate-red apple (FIG. 4A) or caramel-green apple (FIG. 4B) with 3 units of each being removed at the different sampling points.
Figure 4B:
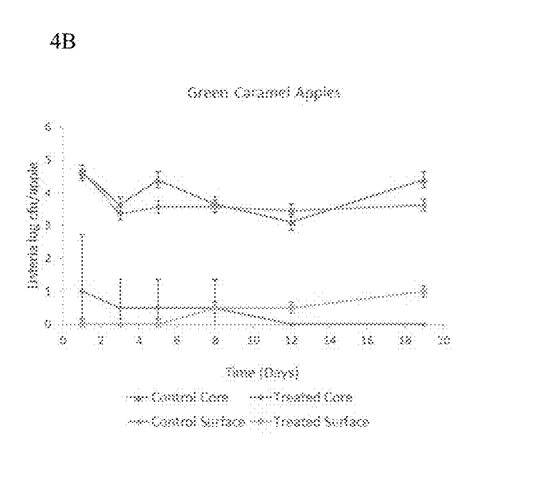

*Listeria* counts on the surface of candy apples prepared from untreated green apples decreased by approximately 1 log cfu over the initial 3 day shelf-life but then remained constant for the remaining 16 day storage period (FIG. 4B; Table 2B). The *L. monocytogenes* counts within the core of candy apples stored at 22° C. fluctuated over the 19 day shelf-life with no overall significant change in counts at the end, compared to Day 1 (FIG. 4B; Table 2B).

No *Listeria* was recovered from candy apples prepared from green or red fruit treated with Ozone then AOP (FIG. 4; Table 2). With regards to the core samples, for both red and green apples, two of the three replicates tested negative for *Listeria* by enrichment following ozone and AOP treated (FIG. 4; Table 2). Therefore, the overall log reduction of *Listeria* was 4-5 log cfu/apple in the case of both candy apple varieties.

In the course of storage, *Listeria* was sporadically recovered from the surface of candy apples prepared from treated red apples but levels of the pathogen did not increase in numbers. *Listeria* within the core of red apples was sporadically recovered over the 19 Day storage period with no overall increase in numbers being observed (FIG. 4A; Table 2A). With treated green apples, surface counts on candy apples increased following after storage Day 5 attaining 1 log cfu/apple at the end of the 19 day storage period (FIG. 4B; Table 2B). In contrast, surviving *Listeria* within the core of green apples decreased over the shelf-life with none of the samples taken passed Day 8 testing positive for the pathogen (FIG. 4B; Table 2B).

Decontamination of Lettuce Heads Using Gas Phase Interventions

The rationale of the research approach was to inactivate pathogens on lettuce heads with the assumption that contamination would be restricted to the surface. This in effect would reduce the reliance of post-harvest washing and also minimize the risk of disseminating pathogens through the processing line. The two treatments evaluated were ozone and a treatment based on using a combination of hydrogen peroxide and UV (AOP).

Hydrogen Peroxide: UV

Figure 5:
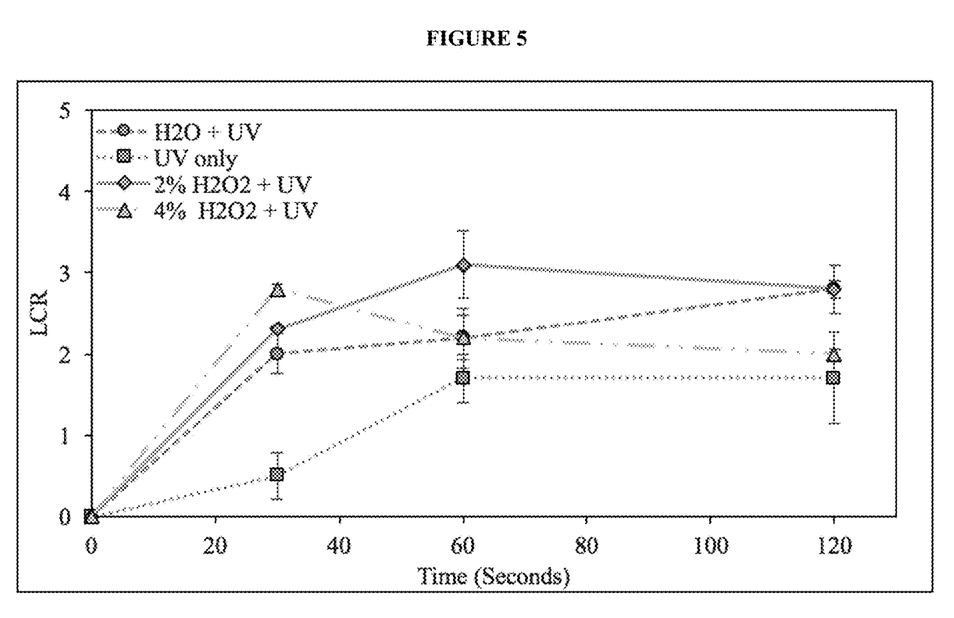
FIG. 5: shows log count reduction of *E. coli* on whole lettuce heads treated with hydrogen peroxide vapor (2 and 4%) for 30, 60, and 120 seconds. The log count reduction (LCR) was calculated by subtracting the average log survivors (3 units of each being removed at the different sampling points) from those recovered on non-treated fruit.

Lettuce heads were placed in the UV reactor chamber and sprayed with hydrogen peroxide (2 or 4%) with and without illumination with UV-C. As a control group inoculated apples were treated with $H_2O$ vapor in place of the $H_2O_2$. The exact amount of vapor that comes in contact with the product is impossible to pin point exactly due to the nature of the produce conveyer type system where vapor enters a chamber from above as the produce passes. However after the process is finished the produce is dried by the circulation fans. Although 4% $H_2O_2$ is more effective in reducing *E. coli* on whole lettuce heads for shorter term treatments, 2% achieved higher reductions after 2 minutes (FIG. 5). When replacing $H_2O_2$ with water, as a control, the treatment is just as effective. Illumination with UV alone supported the lowest log reductions with no increase in efficacy with treatment times>60 seconds. Testing the treated apples with a catalase assay, there was no hydrogen peroxide residues detectable (level of detection>10 ppm).

Ozone

Figure 6:
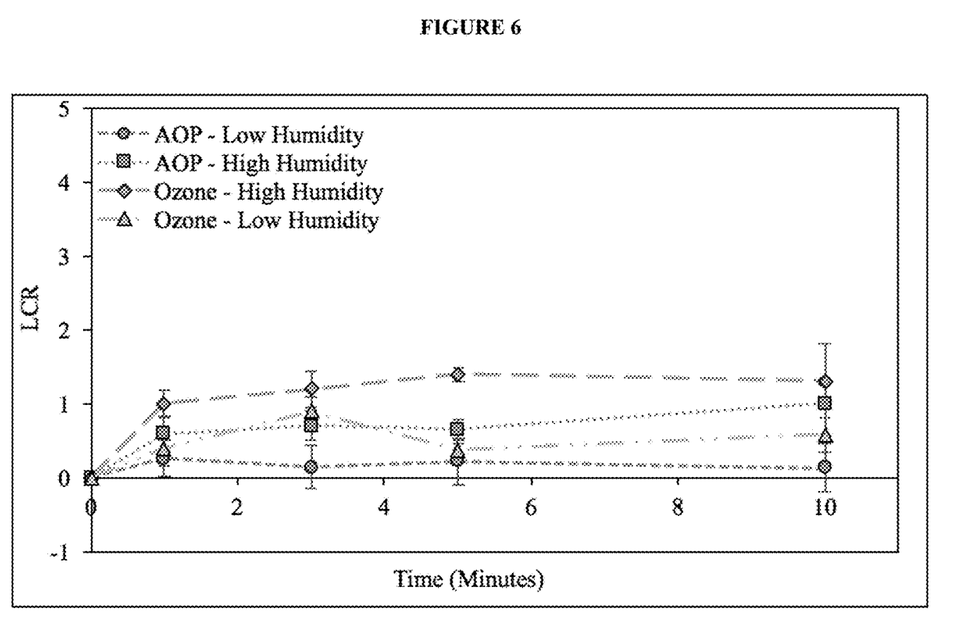
FIG. 6: shows log count reduction of *E. coli* on whole lettuce heads treated with ozone and AOP at high and low humidity. The log count reduction (LCR) was calculated by subtracting the average log survivors (3 units of each being removed at the different sampling points) from those recovered from non-treated fruit.

Ozone applied under high humidity conditions resulted in the highest log reductions (just over 1 log CFU/g), slightly more than AOP process under the same humidity conditions (FIG. 6). Overall the treatment achieved minimal log reductions.

Figure 7:
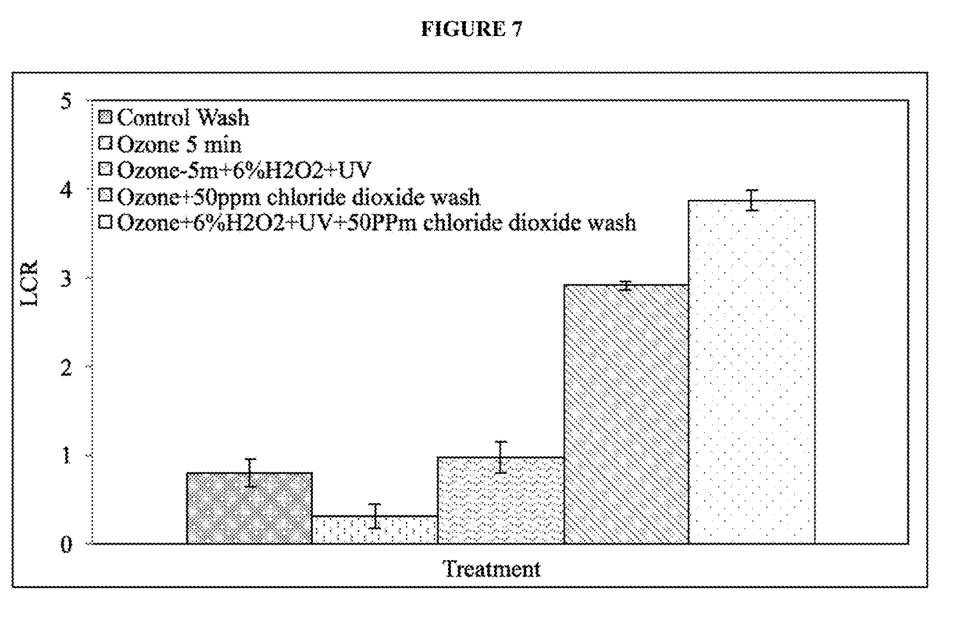
FIG. 7: shows average log count reductions of *E. coli* on whole lettuce heads treated with ozone gas for 5 minutes alone, and in combination with $H_2O_2$, UV, and chlorine dioxide. The log count reduction (LCR) was calculated by subtracting the average log survivors (3 units of each being removed at the different sampling points) from those recovered on non-treated fruit.
Figure 8:
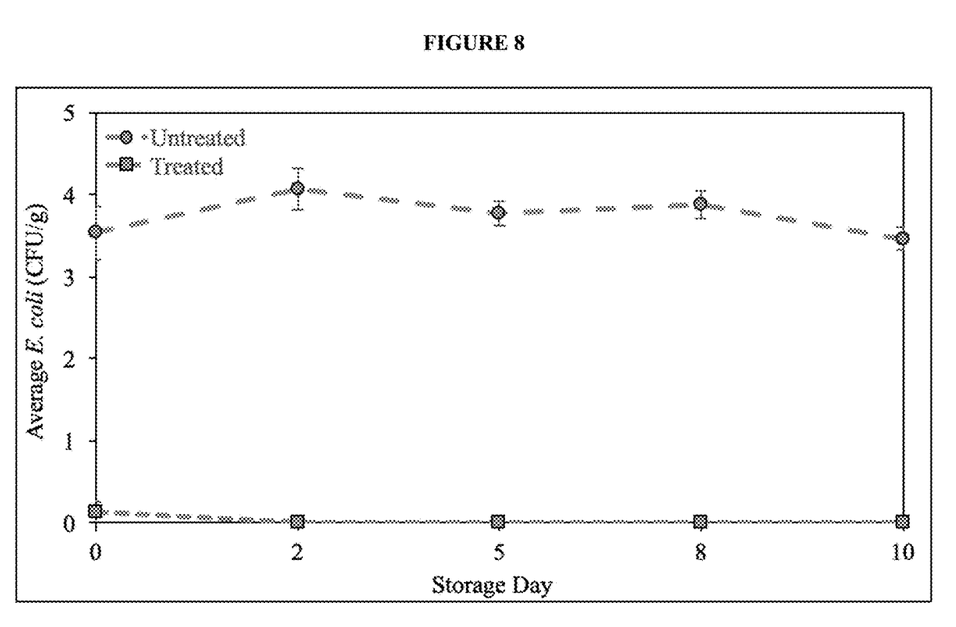
FIG. 8: shows shelf-life of whole heads of lettuce inoculated with *E. coli*, treated with ozone gas for 5 minutes alone, and in combination with $H_2O_2$, UV, and chlorine dioxide (FIG. 7) as well as an untreated control group at storage days 0, 2, 5, 8, and 10.

Efficacy of a Combination of UV, Hydrogen Peroxide, Ozone and Chlorine Dioxide to Decontaminate Lettuce A combined sequential treatment of ozone, 6% $H_2O_2$ and 50 ppm chlorine dioxide achieved nearly 4 log CFU/g reduction (FIG. 7). The combined treatment process (FIG. 8) resulted in lettuce with very low *E. coli* levels, which was maintained throughout the 10-day shelf life, when compared to the untreated group which maintained a steady level of the pathogen (FIG. 8).

Conclusion/Discussion

On Candy apples prepared from apples that had been inoculated with *Listeria* but not treated, the pathogen levels decreased, did not significantly change or increased during the 19 day storage period at 22° C. *L. monocytogenes* was found to increase in the core of non-treated red apples attaining levels of >6 log cfu/apple.

By using a combination of ozone and AOP is was possible to achieve a 4-5 log cfu reduction of *Listeria monocytogenes*. With Candy apples prepared from red apples, the *Listeria* counts within the core or surface of the candy apple did not significantly change when the candy apples held at 22° C. for 19 days. In a similar manner, *Listeria* within the core of treated green apples decreased over the shelf-life. There was evidence of recovery of *Listeria* on the surface of candy apples prepared from treated green apples. However, levels were low and only detected by enriching the samples.

From the studies performed along with those published by others, the fate of *L. monocytogenes* on candy apples depends on several factors. Specifically, the greatest risk posed by *L. monocytogenes* is introduced into the core as opposed to the surface of apples.

The extent to which *L. monocytogenes* grows on/within candy apples is more dependent on if the pathogen has been pre-stressed more so than the storage temperature. In this respect, the application of ozone gas and then AOP would lead to increased stress of *L. monocytogenes* that could explain the restricted growth of the pathogen with candy apples held at room temperature.

In conclusion, by implementing the ozone gas treatment and AOP it is possible to reduce levels of *L. monocytogenes* on and within apples destined for candy apply production. Based on the fact that both interventions are aqueous free there is little risk of actively growing *L. monocytogenes* contaminating the product. Therefore, collectively the evidence presented indicates that storing apples at 4° C. as opposed to room temperature does not bring significant benefits to *L. monocytogenes* control. Consequently, candy apples prepared as described can be stored at room temperature without any additional risk of being contaminated or supporting the growth of *L. monocytogenes*.

Experiment 4: Decontamination of Different Fruit and Vegetables Using a Combination of UV/Ozone/Hydrogen Peroxide This experiment was conducted to determine the log count reduction of *Listeria monocytogenes* introduced on different produce types and treated with a combination of UV/Ozone/Hydrogen peroxide.

Methods

Bacteria and Culture Conditions

*Listeria monocytogenes* (serotypes 4a, 4b, 1/2b, 1/2a, and 3a) was cultivated overnight in TSB at 37° C. and cells harvested by centrifugation. The pellet was suspended in saline to a final cell density of 8 log cfu/ml ($OD_{600}$-0.2). The cell suspension was held at 4° C. for up to 12 hours prior to use.

The test vegetable and fruit were spot inoculated on the surface to skin, around the top of the fruit, with 100 µl of the test bacterium at a concentration of 8-log 10 CFU/ml. The apples were then dried in a biosafety cabinet for 20 minutes to 4 hours, before being transferred to 4° C. storage for a maximum of 24 hours. To internalize the bacteria, 1 ml of the suspension was added to the stem crevice and put under a vacuum for 1 minute, removed from the vacuum and left for 1 minute, before being vacuumed once more for another minute.

Reactor

The UV reactor consisted of an ultraviolet fixture (Sani-Ray™—stainless steel, 24"×9"×5", 120 v 50/60 Hz) containing 4×25 W lamps (measured at 254 nm at 100 hours and 80° C.) that were 24" long and 15 mm in diameter with a UV output of 8.5 were held a distance of 16 cm from the conveyer surface. Standard UV lamps (serial #05-1348) and ozone lamps (#05-1349, ozone output of 2.3) were both used (2 of each). A UVX radiometer (UVP™ calibrated to +/−5% according to manufacturer instructions) was used to monitor the lamps intensity to ensure consistency. The hydrogen peroxide (obtained from Sigma-Aldrich™, 30% solution) was prepared at varying concentrations (2-4% v/v) and pre-warmed in a hot water bath to 22 or 48° C. then placed in the reservoir of an atomizer/vaporizer. The processing chamber was pre-warmed with a fan heater that was switched off just prior to placing the inoculated apples into the unit. The apples were held in the center of the unit for the allotted time period removed at the opposite end.

Results

Results are shown below in Table 3.

TABLE 3

| Produce Type | Log cfu/unit Initial Count | Log cfu/unit Post-Treatment | Log Count Reduction | % Reduction |
| --- | --- | --- | --- | --- |
| Avocado | 5.74 ± 0.13 | | | |
| Vapor | | <1 | >5.74 | 100 |
| Fogging | | <1 | >5.74 | 100 |
| Peaches | 6.84 ± 0.29 | | | |
| Vapor | | 4.71 ± 0.31 | 2.16 ± 0.91 | 99.259 |
| Fogging | | 1.33 ± 0.58 | 5.51 ± 0.58 | 99.999 |
| Lemon | 7.10 ± 0.06 | | | |
| Vapor | | 2.98 ± 0.25 | 4.12 ± 0.25 | 99.992 |
| Fogging | | <1 | >6.10 | 99.999 |
| Cucumber | 7.03 ± 0.09 | | | |
| Vapor | | 4.26 ± 0.23 | 2.76 ± 0.23 | 99.830 |
| Fogging | | 3.91 ± 0.16 | 3.12 ± 0.16 | 99.924 |
| Cucumber core | 5.34 ± 0.16 | | | |
| Vapor | | 5.18 ± 0.08 | 0.18 ± 0.08 | 30.820 |
| Fogging | | 5.12 ± 0.03 | 0.22 ± 0.03 | 39.744 |
| Zucchini | 6.69 ± 0.07 | | | |
| Vapor | | 5.62 ± 0.08 | 1.07 ± 0.08 | 59.262 |
| Fogging | | 5.34 ± 0.32 | 1.35 ± 0.32 | 74.296 |
| Cantaloupe | 7.10 ± 0.04 | | | |
| Vapor | | 3.89 ± 0.29 | 3.71 ± 0.29 | 99.938 |
| Fogging | | 2.10 ± 0.17 | 5.00 ± 0.17 | 99.999 |
| Zucchini (core) | 6.52 ± 0.17 | | | |
| Vapor | | 6.30 ± 0.31 | 0.22 ± 0.31 | 39.74 |
| Fogging | | 6.10 ± 0.38 | 0.42 ± 0.38 | 61.981 |
| Pepper | 6.97 ± 0.23 | | | |
| Vapor | | 5.08 ± 0.21 | 1.89 ± 0.21 | 98.712 |
| Fogging | | 4.79 ± 0.06 | 2.18 ± 0.06 | 99.339 |
| Tomato | 4.83 ± 0.04 | | | |
| Vapor | | 4.53 ± 0.45 | 0.48 ± 0.45 | |
| Fogging | | 3.61 ± 0.26 | 1.22 ± 0.26 | |
| Tomato (core) | 6.52 ± 0.20 | | | |
| Vapor | | 6.37 ± 0.10 | 0.15 ± 0.10 | |
| Fogging | | 6.20 ± 0.49 | 0.32 ± 0.49 | |
| Mango | 5.42 ± 0.21 | | | |
| Vapor | | 2.50 ± 0.26 | 2.50 ± 0.26 | |
| Fogging | | <1 | >4.42 | |

What is claimed is:

1. A method for inactivating bacteria and/or reducing microbial count on a food product susceptible to microbial presence, the method comprising:
transporting said food product continuously on a continuous conveyor through a processing chamber being free of water for a processing dwell time in the processing chamber of between 5-120 seconds and subjecting the food product, during the processing dwell time, to exposure within the processing chamber with ultraviolet C (UV-C) light, hydrogen peroxide vapor, ozone generated by ozone lamps emitting at a wavelength of range of 125-225 nm to produce ozone from oxygen present in the air, and heat,
wherein
the hydrogen peroxide vapor is present at up to 12% v/v solution, and the temperature inside the processing chamber is maintained between about 22° C. and 60° C.

2. The method of claim 1, wherein the bacteria is *Listeria*.

3. The method of claim 1, wherein the food product is a fruit.

4. The method of claim 1, wherein wavelength range of the UV-C light is between 290 nm and 100 nm.

5. The method of claim 1, wherein concentration of the hydrogen peroxide vapor is between 2-6% v/v.

6. The method of claim 1, wherein flow rate of the hydrogen peroxide vapor is between 0 and 10 liters per minute.

7. The method of claim 1, wherein humidity inside the processing chamber is maintained at between 60% to 100% relative humidity.

8. The method of claim 1, said method excluding a step of contacting an ozone-containing liquid with the food product.

9. The method of claim 1, wherein the ozone and the hydrogen peroxide vapor are provided by two separate sources.

10. The method of claim 1, wherein hydrogen peroxide vapor is provided by a hydrogen peroxide atomizer or vaporizer.

11. A method for treating a food product that has at least one surface and is susceptible to microbial presence, the method comprising:
transporting said food product on a conveyor into a processing chamber being free of water for a processing dwell time in the processing chamber of between 5-120 seconds and
subjecting the food product, during the processing dwell time, to exposure within the processing chamber with ultraviolet C (UV-C) light, hydrogen peroxide vapor, ozone generated by ozone lamps emitting at a wavelength of range of 125-225 nm to produce ozone from oxygen present in the air, and heat,
degrading hydrogen peroxide of the hydrogen peroxide vapor by UV decomposition such that antimicrobial free radicals are generated and treating the food product by penetration of the antimicrobial free radicals into one or more shaded areas on the at least one surface of the food product to be treated,
wherein
the hydrogen peroxide vapor is present at up to 12% v/v solution, and the temperature inside the processing chamber is maintained between about 40° C. and 60° C.

* * * * *